United States Patent [19]

Murray

[11] 4,368,125
[45] Jan. 11, 1983

[54] APPARATUS FOR EXTRACTING LIQUID FROM A SUSPENSION

[75] Inventor: James D. Murray, Birmingham, Ala.

[73] Assignee: Passavant-Werke AG & Co. KG, Fed. Rep. of Germany

[21] Appl. No.: 289,805

[22] Filed: Aug. 3, 1981

[51] Int. Cl.³ ............................................. B01D 33/06
[52] U.S. Cl. .................................... 210/403; 210/374; 210/393
[58] Field of Search ............... 210/374, 402, 403, 393, 210/396, 411, 408, 359, 377, 380.3, 383; 162/56

[56] References Cited

U.S. PATENT DOCUMENTS 3,275,150  9/1966  Tait ...................................... 210/393
4,306,975  12/1981  Siewert ................................ 210/403

FOREIGN PATENT DOCUMENTS 211451  9/1968  U.S.S.R. .............................. 210/402

*Primary Examiner*—Charles N. Hart
*Assistant Examiner*—Sharon T. Cohen
*Attorney, Agent, or Firm*—Woodford R. Thompson, Jr.

[57] ABSTRACT

Apparatus for extracting liquid from a suspension includes a horizontally mounted rotatable filter media covered concentrator drum with an inner drum rotatable about a horizontal axis within the concentrator drum and defining a suspension transition chamber therebetween. The drums are mounted in a common frame and are rotated in opposite directions with the suspension being introduced at one end of the transition chamber. Angularly disposed vanes on the outer surface of the inner drum convey the suspension through the transition chamber and turn and lift the suspension to a maximum elevation below the top of the transition chamber with the suspension falling back before reaching the top of the transition chamber. The filter media is cleaned as it moves at an elevation above the suspension.

11 Claims, 5 Drawing Figures

APPARATUS FOR EXTRACTING LIQUID FROM A SUSPENSION

BACKGROUND OF THE INVENTION

This invention relates to apparatus for extracting liquid from a suspension and more particularly to sludge filtering apparatus wherein free water or water which is easily removed is extracted from the solid materials to thus partially de-water the suspension whereby the suspension is thickened prior to delivery to conventional filter apparatus for further removal of liquid.

Heretofore in the art to which my invention relates, various devices have been proposed for partially dewatering suspensions, such as sludge. For example, perforated conveyor belts for filtering purposes have been employed. Such filtering conveyors have also been combined with complicated filter press installation wherein the suspension is confined between spaced apart perforated conveyor belts and pressure is applied by means of rollers. Also, the efficiency of such perforated conveyor belts has been improved by supplementing the gravity effect and the roller pressure effect with a vacuum which is applied to the liquid discharge side of the perforated conveyor belt. Such apparatus not only increases the energy consumption but also greatly increases the belt's friction. Problems have been encountered with such perforated conveyor belts due to the fact that they become plugged with solid materials which cannot be satisfactorily extracted, even with the application of vacuum beneath the belt.

Prior attempts to counteract the plugging of the perforated conveyor belts have included scraping elements which remove the deposited solid matter from the belt's surface in order to allow the liquid to reach the perforations in the belt. Such a device is disclosed in U.S. Pat. No. 2,097,529. Also, U.S. Pat. No. 3,984,329 discloses a filtering device wherein sludge is deposited as a sludge bed on a substantially horizontal conveyor belt. As the sludge moves along, it encounters a series of laterally and longitudianally spaced flow breakers which are subjected to an angular biasing force which urges them into a normal operating position against the movement of the sludge bed on the conveyor. Such apparatus is not only complicated and expensive but it requires a considerable amount of maintenance for satisfactory operation thereof.

BRIEF SUMMARY OF THE INVENTION

In accordance, with my invention I overcome the above and other difficulties by providing a horizontally mounted, rotatable filter media covered concentrator drum with an inner rotatable about a horizontal axis within the concentrator drum and defining a suspension transition chamber therebetween. A common frame supports both drums as the drums are rotated in opposite directions with the suspension being introduced at one end of the transition chamber and being discharged at the other end thereof. Angularly disposed vanes are mounted on the outer surface of the inner drum in position to convey the suspension through the transition chamber and at the same time turn and lift the suspension to a maximum elevation which is below the top of the transition chamber so that the suspension falls back before reaching the top of the transition chamber. The filter media is continuously cleaned as it moves at an elevation above the suspension whereby the filter media is cleaned each time the concentrator drum makes a complete revolution. The inner drum also is used as a flocculator drum with the suspension being discharged therefrom into the concentrator drum adjacent the receiving end of the transition chamber.

DESCRIPTION OF THE DRAWINGS

Apparatus embodying features of my invention is illustrated in the accompanying drawings, forming a part of the application, in which.

DETAILED DESCRIPTION

Figure 1:
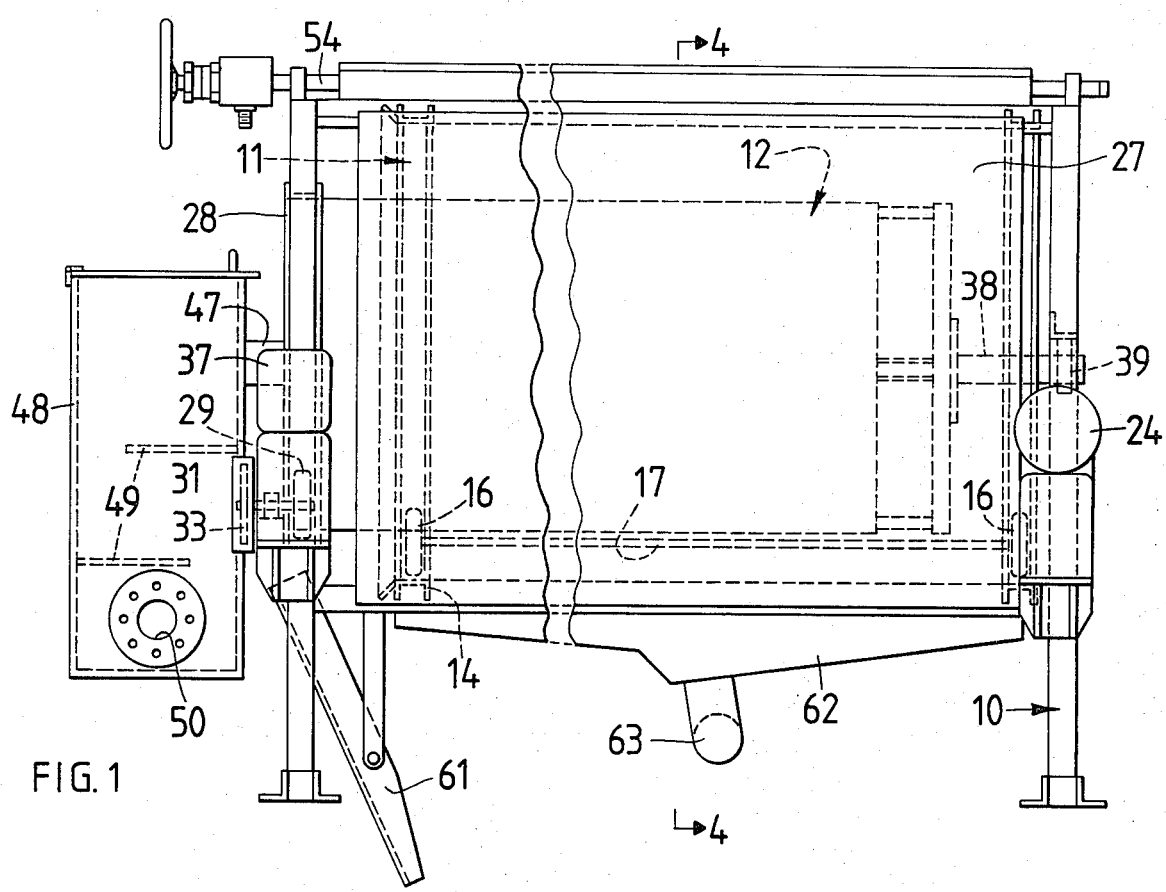
FIG. 1 is a side elevational view.

Referring now to the drawings for a better understanding of my invention, I show a supporting frame 10 which is adapted to support an outer concentrator drum 11 and an inner drum 12 with each drum being rotatable about a generally horizontal axis. The concentrator drum 11 is covered by or carries a conventional filter media, such as a filter screen 13. Preferably, the filter screen 13 is in the form of removable panels whereby selected panels may be easily removed and/or installed.

Figure 2:
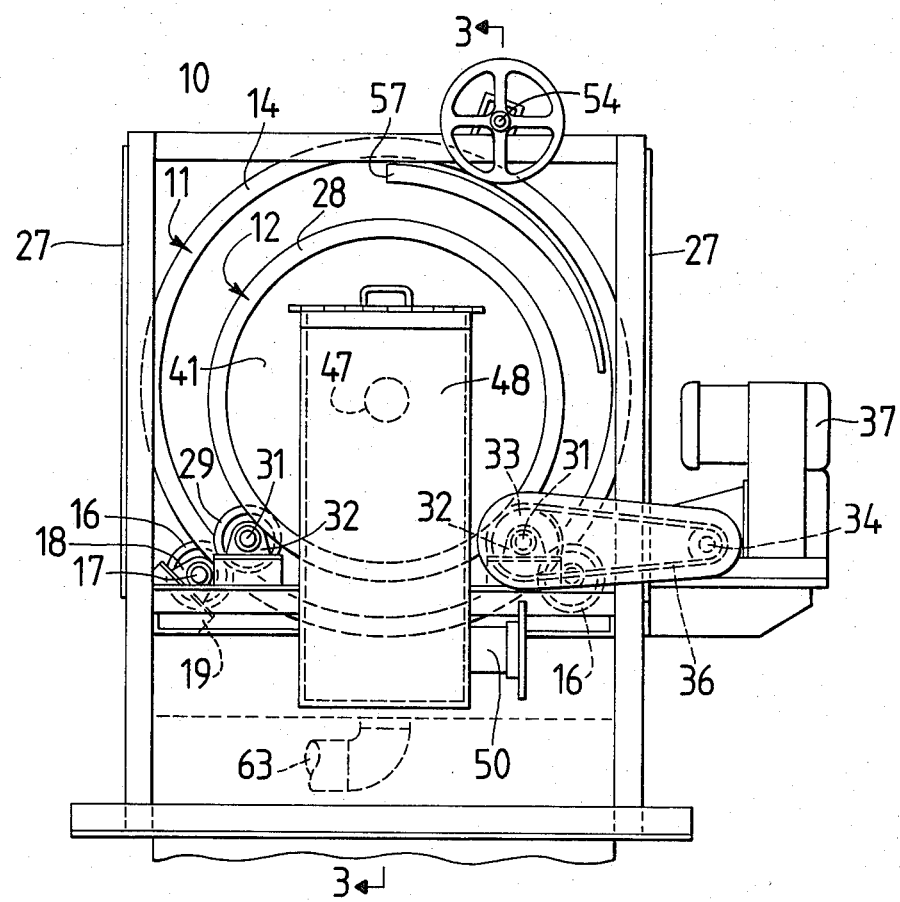
FIG. 2 is an end elevational view as viewed from the left side of FIG. 1.
Figure 3:
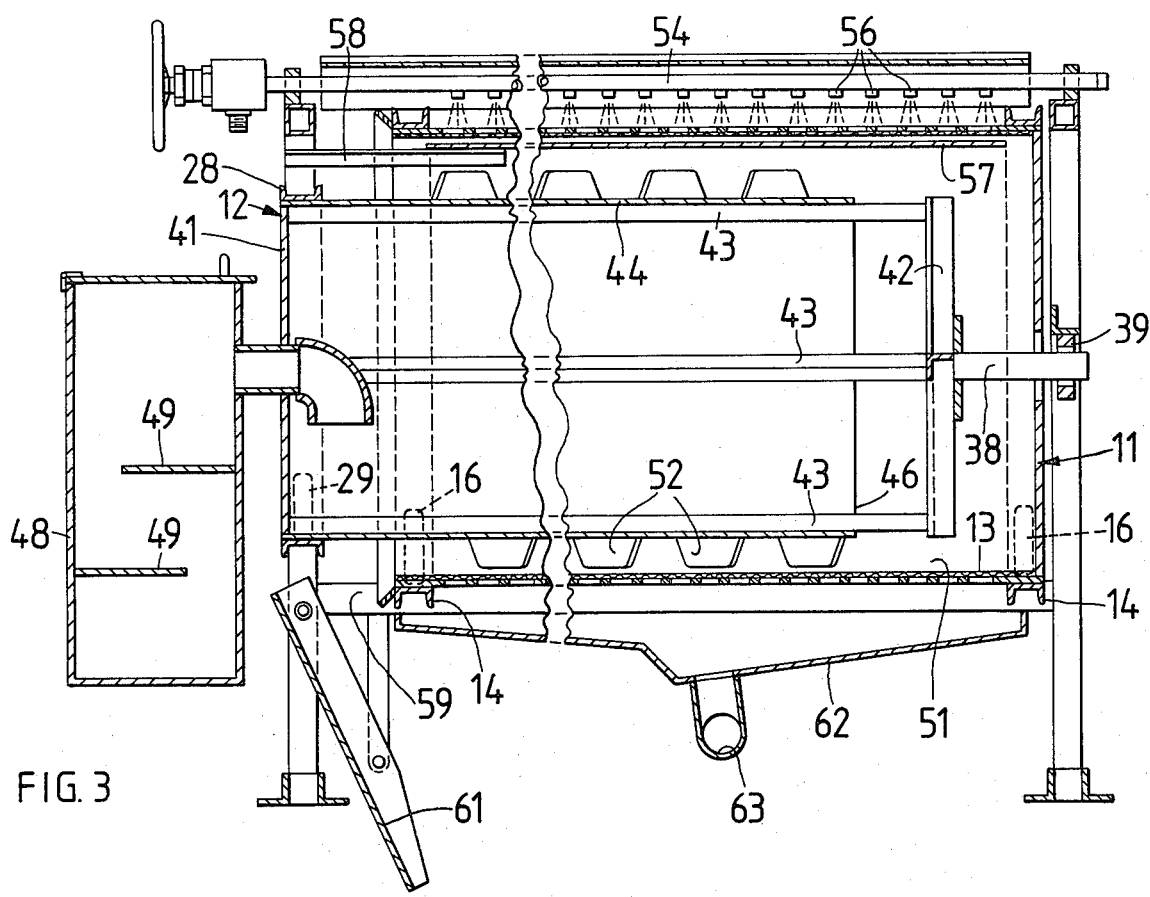
FIG. 3 is a vertical sectional view taken generally along the line 3—3 of FIG. 2.
Figure 4:
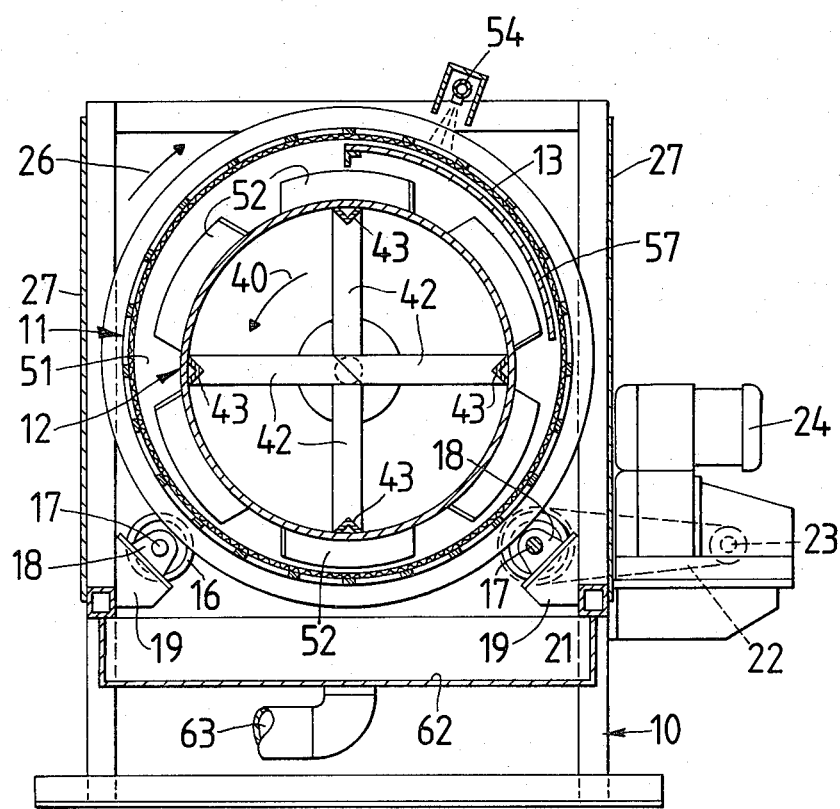
FIG. 4 is a sectional view taken generally along the line 4—4 of FIG. 1.
Figure 5:
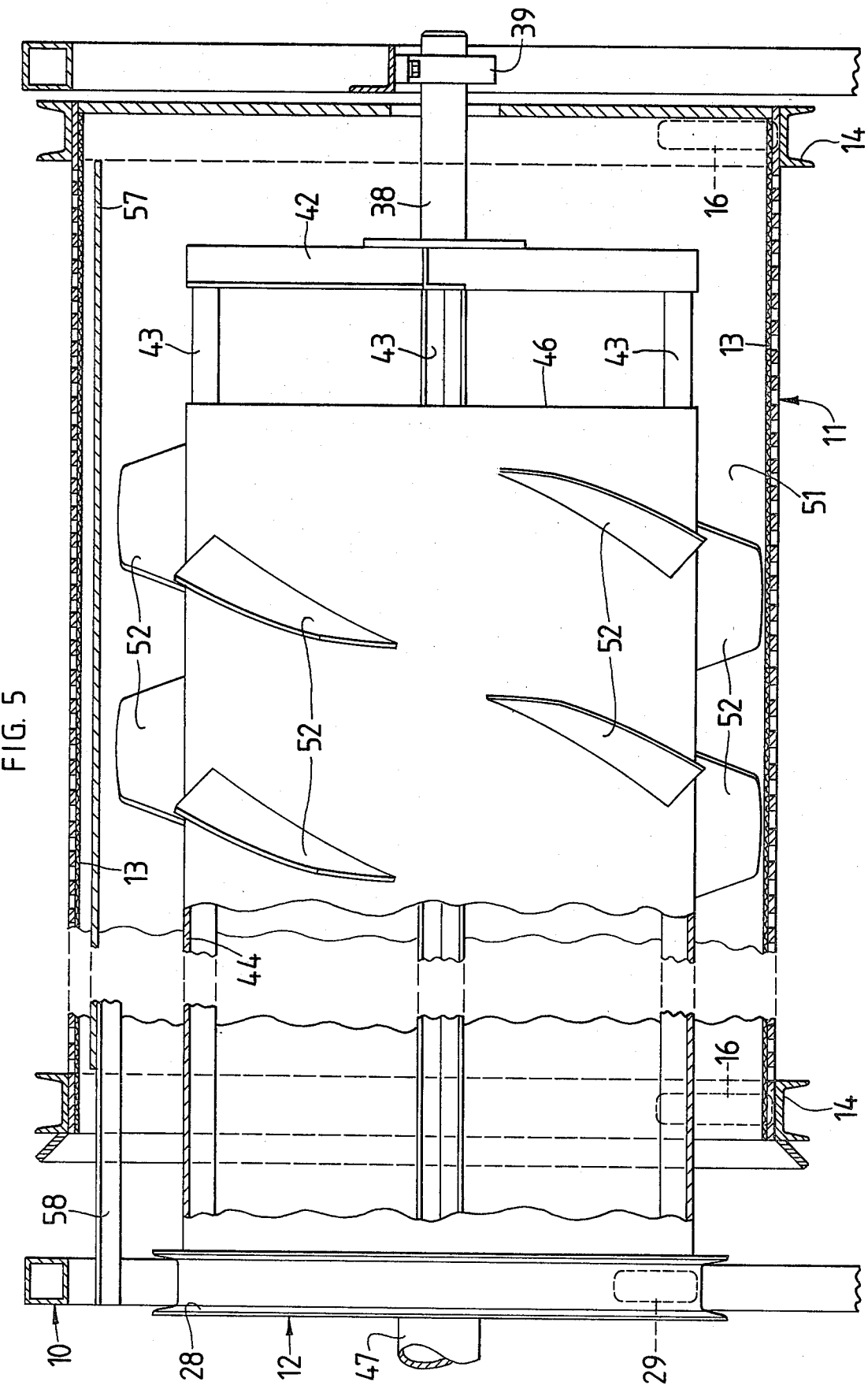
FIG. 5 is an enlarged sectional view corresponding to FIG. 3 with parts being shown in elevation.

As shown in FIG. 3, an annular channel-like guide rail 14 is carried by each end of the concentrator drum 11 in position to receive supporting and driving rollers 16 carried by spaced apart, parallel shafts 17. The shafts 17 are supported by suitable bearings 18 which in turn are mounted on support brackets 19 carried by the frame 10, as shown. Mounted on one of the shafts 17, as shown in FIGS. 2 and 4 is a sprocket 21 which is operatively connected by a drive chain 22 to a drive shaft 23 which in turn is operatively connected to a drive motor 24 whereby rotary motion is imparted to the concentrator drum 11 in the direction of the arrow 26. Suitable plate-like shields 27 are mounted at opposite sides of the frame 10, as shown.

The inner drum 12 is mounted for rotation within the concentrator drum 11, as shown. One end of the inner drum 12 carries an annular channel-like guide rail 28 in which traction and support rollers 29 ride. The traction rollers 29 are carried by supporting shafts 31 which are supported in the suitable bearing blocks 32, as shown. Mounted on the shaft 31 is a sprocket 33 which is operatively connected to a drive shaft 34 by a sprocket chain 36. The shaft 34 is operatively connected to a drive motor 37 whereby rotary motion is imparted to the inner drum 12 which is supported at one end by the rollers 29. Secured to the other end of the inner drum 12 is a centrally disposed, axially extending shaft 38 which in turn is mounted for rotation in a bearing unit 39. The inner drum 12 is rotated in a direction opposite the direction of rotation of the outer, concentrator drum 11, as indicated by arrow 40. The inner drum 12 and outer drum 11 are driven at variable speeds ranging from approximately 1 to 10 revolutions per minute.

In the drawings, the inner drum 12 is shown as a flocculator drum having one end thereof closed by a closure plate 41. The other end of the drum 12 is supported by angularly spaced, radially extending support elements 42 which connect the shaft 38 to longitudinally extending, angularly spaced members 43 secured to the inner surface of the shell 44 for the inner drum 12. The shell 44 terminates inwardly of the radially extending members 42, as shown in FIG. 3, to provide an annular discharge passageway 46 therebetween.

Extending through a suitable opening in the plate-like 41 is a suspension supply conduit 47 which receives the suspension from a feed box 48 having a plurality of deflector baffles 49 therein in position to agitate the suspension prior to introduction into the inner flocculator drum 12. The suspension is supplied to the feed box 48 by a supply conduit 50 which is connected to a suitable source of supply, not shown.

It will thus be seen that the inner drum 12 is mounted for rotation about a horizontal axis within and in space relation to the inner surface of the concentrator drum 11 and defines a suspension transition chamber 51 therebetween. Accordingly, upon introduction of the suspension into the inner, flocculator drum 12 through the supply conduit 47, the suspension flows through drum 12 and then is discharged through the annular opening 46 into the receiving end of the transition chamber 51. Angularly disposed vanes 52 are carried by the outer surface of the inner, flocculator drum 12, as shown in FIGS. 3 and 4, in position to convey the suspension from the receiving end of the transition chamber 51 to the other end thereof and concomitantly turn and lift the suspension to an elevation below the top of the transition chamber 51 so that the suspension reaches a maximum elevation and falls back before reaching the top of the transition chamber. Accordingly, by conveying the suspension whereby it is repeatedly lifted and then falls back before reaching the top of the transition chamber 51 the surface area of the suspension exposed to the filter media is greatly increased and at the same I provide a minimum barrier of solids previously separated from liquid.

As clearly shown in FIGS. 3 and 4, the inner flocculator drum 12 is mounted eccentrically relative to the outer, concentrator drum so that the angularly disposed vanes 52 move closer to the bottom than the top of the concentrator drum 11. That is, while the concentrator drum 11 and the flocculator drum 12 each rotate about a horizontal axis, the axis of rotation of the flocculator drum 12 is eccentric relative to the axis of rotation of the concentrator drum 11. By causing the angularly disposed vanes 52 to move closer to the bottom than the top of the concentrator drum, any solids separating or settling toward the bottom of the concentrator drum 11 are continuously agitated by the vanes 52, thus providing a minimum barrier of such solids adjacent the inner surface of the filter media 13. Also, by positioning the angularly disposed vanes 53 closer to the bottom than the top of the concentrator drum 11, the suspension is conveyed in a more efficient manner.

As clearly shown in FIGS. 3 and 4, a spray manifold 54 having a plurality of spray nozzles is mounted above the concentrator drum 11 in position to spray water downwardly through an area of the filter media 13 as it moves at an elevation above the maximum elevation of the suspension in the transition chamber 51 whereby the filter media is continuously cleaned as it passes beneath the spray nozzles 56. Accordingly, the filter media 13 covering the entire inner surface of the concentrator drum 11 is cleaned each time the concentrator drum makes a complete revolution. Mounted beneath the spray nozzles 56 and within the transition chamber 51 between the angularly disposed vanes 52 and the inner surface of the concentrator drum 11 is a deflector member 57 which is in position to deflect cleaning water toward the downgoing side of the concentrator drum 11, as shown in FIG. 4. The deflector member 57 is in the form of an arcuate member which extends from a position subjacent the top of the transition chamber 51 to an elevation superjacent the maximum elevation that the suspension reaches in the the transition chamber 51. The deflector member 57 is supported by suitable means, such as by support brackets 58 which connect the deflector member to the supporting frame 10.

After the suspension is conveyed from the receiving end of the transition chamber 51 to the discharge end thereof, the thickened sludge or suspension is discharged as at 59 onto a suitable discharge chute 61 whereupon the partially de-watered suspension may be transfered to other equipment for further filtration or treatment in a manner well understood in the art to which my invention relates. The filtrate passing through the filter media 13 is discharged into a suitable receptacle 62 whereupon it is discharges through a suitable conduit 63.

From the foregoing description, the operation of my improved apparatus for extracting liquid from a suspension will be readily understood. The suspension to be partially de-watered or thickened is introduced to the feed box 48 wherein the baffles 49 bring about agitation of the suspension to prevent settling prior to introduction into the flocculation drum. After passing through the flocculation drum 12, the suspension is discharged through the opening 46 at the discharge end of the drum 12 whereupon it then enters the receiving end of the transition chamber 51. The angularly disposed vanes 52 then convey the suspension through the transition chamber 51 and at the same time turn and lift the suspension to an elevation below the top of the transition chamber so that the suspension repeatedly reaches a maximum elevation and then falls back before reaching the top of the transition chamber 51 to thus increase the surface area of the suspension exposed to the filter media 13 and provide a minimum barrier of solids which have become separated from the liquid. Upon reaching the discharge end of the concentrator drum 11, the thickened suspension is discharged onto the chute 61 whereupon it may then be transfered to other equipment for treatment or further filtration.

From the foregoing, it will be seen that I have devised improved apparatus for extracting liquid from a suspension. By providing a flocculation drum which is mounted within a concentrator drum, my entire apparatus is mounted within a common frame, thus eliminating the necessity of having to provide separate frames for the drums, thus greatly reducing the cost of the equipment. Also, by providing counter rotating drums which are adapted to rotate at variable speeds of rotation, together with the angularly disposed vanes on the outer surface of the inner drum, the suspension is not only conveyed through the transition chamber but is also turned and lifted to an elevation below the top of the transition chamber whereby the suspension repeatedly reaches a maximum elevation and then falls back before reaching the top of the transition chamber to thus increase the surface area of the suspension exposed to the filter media and at the same time provide a minimum barrier of solids previously separated from the liquid. Furthermore by providing spray nozzles about the concentrator drum in position to spray water downwardly through an area of the filter media as it moves at an elevation above the maximum elevation of the suspension in the transition chamber, I provide means for continuously cleaning the filter media whereby the entire filter media covering the inner surface of the concentrator drum is thoroughly cleaned each time the concentrator drum makes a complete revolution and at the same time the deflector member directs the cleaning water toward the down-going side of the concentrator drum whereby it falls through the cleaning media to thus bring about a more efficient cleaning operation.

While I have shown my invention in but one form, it will be obvious to those skilled in the art that it is not so limited, but is susceptible of various changes and modifications without departing from the spirit thereof.

What I claim is:

1. Apparatus for extracting liquid from a suspension comprising:
   (a) a filter media covered concentrator drum mounted for rotation about a generally horizontal axis,
   (b) an inner drum mounted for rotation about a horizontal axis within and in spaced relation to the inner surface of said concentrator drum and defining a suspension transition chamber therebetween,
   (c) means for rotating said concentrator drum and said inner drum in opposite directions,
   (d) means for introducing said suspension into said concentrator drum at one end of said transition chamber,
   (e) angularly disposed vanes carried by the outer surface of said inner drum in position to convey said suspension from said one end of said transition chamber to the other end thereof and concomitantly turn and lift said suspension to an elevation spaced below the top of said transition chamber so that said suspension reaches a maximum elevation and falls back before reaching said top of said transition chamber to increase the surface area of said suspension exposed to said filter media and provide a minimum barrier of solids previously separated from liquid,
   (f) means for cleaning said filter media while it is moving at an elevation above said maximum elevation of said suspension in said transition chamber, and
   (g) means for discharging said suspension adjacent said other end of said transition chamber.

2. Apparatus as defined in claim 1 in which said inner drum is a flocculator drum having a suspension receiving end adjacent said other end of said transition chamber and a suspension discharge end adjacent said one end of said transition chamber for introducing said suspension into said transition chamber.

3. Apparatus as defined in claim 2 in which a feed box delivers said suspension into said receiving end of said flocculator drum and said feed box has deflector baffles therein in position to agitate said suspension prior to introduction into said flocclator drum.

4. Apparatus as defined in claim 2 in which said suspension discharge end of said flocculator drum is supported by angularly spaced, radially extending support elements and a generally annular discharge passageway is provided in the shell of said flocculator drum adjacent said discharge end.

5. Apparatus as defined in claim 1 in which said inner drum is mounted eccentrically relative to said concentrator drum so that said angularly disposed vanes move closer to the bottom than the top of said concentrator drum.

6. Apparatus as defined in claim 1 in which a plurality of spray nozzles are mounted above said concentrator drum in position to spray water downwardly through an area of said filter media as it moves at an elevation above said maximum elevation of said suspension in said transition chamber whereby said filter media is cleaned.

7. Apparatus as defined in claim 6 in which a deflector member is mounted beneath said spray nozzles within said transition chamber between said angularly disposed vanes and the inner surface of said concentrator drum in position to deflect cleaning water toward the downgoing side of said concentrator drum.

8. Apparatus as defined in claim 7 in which said deflector member is an arcuate member extending from a position subjacent the top of said transition chamber to an elevation superjacent said maximum elevation of said suspension in said transition chamber.

9. Apparatus as defined in claim 1 in which said filter media convering said concentrator drum is in the form of removable panels.

10. Apparatus as defined in claim 1 in which said inner drum and said concentrator drum are each driven at variable speeds of rotation.

11. Apparatus as defined in claim 10 in which said inner drum and said concentrator drum are each driven at a speed ranging from approximately 1 to 10 revolutions per minute.

* * * * *